US012073060B1

(12) United States Patent
Yong (10) Patent No.: US 12,073,060 B1
(45) Date of Patent: Aug. 27, 2024

(54) PERSONALIZABLE ON-SCREEN DISPLAY MENU DIRECT SHORTCUT CONTROLS

(71) Applicant: Dell Products L.P., Round Rock, TX (US)

(72) Inventor: Khang Chian Yong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/191,184

(22) Filed: Mar. 28, 2023

(51) Int. Cl.
  *G06F 3/0482* (2013.01)
  *G06F 3/0338* (2013.01)
  *G06F 3/0487* (2013.01)

(52) U.S. Cl.
  CPC .......... *G06F 3/0482* (2013.01); *G06F 3/0338* (2013.01); *G06F 3/0487* (2013.01)

(58) Field of Classification Search
  CPC ..... G06F 3/0482; G06F 3/0338; G06F 3/0487
  See application file for complete search history.

(56) References Cited

U.S. PATENT DOCUMENTS

| 11,435,875 B2 | 9/2022 | Yong | |
| 2012/0226978 A1* | 9/2012 | Harberts | G06F 3/0485 715/702 |
| 2022/0075488 A1* | 3/2022 | Yong | G06F 3/04842 |

* cited by examiner

*Primary Examiner* — Stephen G Sherman
(74) *Attorney, Agent, or Firm* — ZAGORIN CAVE LLP; Robert W. Holland (57) ABSTRACT

An information handling system display has a joystick input device that manages selections from an on screen menu with plural joystick input device inputs to navigate from a root menu to a command a function. A one-action function menu is selectable to manage inputs made at the joystick input device so that each of the up, down, left and right joystick inputs commands a function with a single press and a press down joystick input returns the on screen display menu to offer other input options with multiple inputs. The one-action joystick inputs are configurable through the root menu so that an end user can select which commands are quickly available, such as input source selection or picture in picture activation.

20 Claims, 8 Drawing Sheets

PERSONALIZABLE ON-SCREEN DISPLAY MENU DIRECT SHORTCUT CONTROLS

BACKGROUND OF THE INVENTION

Field of the Invention

The present invention relates in general to the field of information handling system displays, and more particularly to an information handling system display personalizable on-screen display menu with direct shortcut controls.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Information handling systems integrate processing components in a housing to process information, such as a processor that executes instructions stored in a memory. Generally one goal of information handling system processing is to present the results of processing as visual images at a display. Visual images are typically defined as pixel values that are communicated from the processor to the display scanned across pixels of the display to define a color presented at each pixel. As an example, pixel values are communicated from a graphics processor of an information handling system through a cable having a standardized interface and to a timing controller of the display that scans the pixel values based upon the resolution of the display. Standardized cable interfaces for communication of pixel values include HDMI, DVI, DisplayPort and USB. Typically, the information handling system housing and display each include standardized cable ports to couple a cable for communicating the pixel values. In some instances, a display integrates into an information handling system housing such as is commonly found in portable information handling systems. In such systems, a standard cable is often used within the housing to interface the integrated display and processor.

One difficulty with presenting visual images at a display is that the display typically includes settings that can impact the quality of presented visual images, such as color, brightness and contrast. In addition, the display often includes physical device controls, such as selection of an input source. For instance, a television may present visual images defined by an internal graphics processor or defined by external devices and communicated through a cable, such as from a set top box or optical disc player. The television display panel may present visual images based upon the selection of an input source from an internal source of plural available external sources at each plural port. In some instances, display settings and physical device controls may be managed with commands provided from an interfaced information handling system, such as through a bi-directional control interface. However, an external display typically must also include an integrated capability to manage settings and physical devices through an integrated controller and an onscreen menu. In U.S. Pat. No. 11,435,875 by Yong, which is incorporated herein as if fully set forth, a centrally located joystick button surrounded by four input buttons accept end user inputs to select display settings. A static dynamic on screen display menu has upper and lower input buttons with static values and side buttons that slide through plural available selections. An end user interacts through the joystick with left or right inputs to slide menu options across a central position and then selects the option at the central location by pressing down on the joystick.

The static dynamic on screen display menu provides convenient and rapid access to menu selection by sliding the dynamic center icons across a central position to select a menu for engagement. The upper and lower static menu selections provide a known response of opening a menu or closing a menu so an end user can arrive at a known logical input at any time. After a display is initially set up and operating, most end users will only interact with the dynamic menu to perform a limited set of actions, such as changing the source port or adjusting display characteristics of brightness and color. Although scrolling through the dynamic icons provides a rapid and intuitive interface, it does call for the end user to select through multiple options to find the desired menu.

SUMMARY OF THE INVENTION

Therefore, a need has arisen for a system and method which selectively reconfigures static dynamic joystick inputs to have one push action for selected functions as a shortcut.

In accordance with the present invention, a system and method are provided which substantially reduce the disadvantages and problems associated with previous methods and systems that control display settings through a joystick controller. A display has a one-action menu that, when activated, performs a function in response to each of a joystick input device inputs, and reverts to a root menu function selection to support display functions not associated with a one-action input. An end user configures the one-action menu to associate one function with each of the joystick inputs for rapid control of commonly used display functions.

More specifically, an information handling system display presents visual images from plural sources interfaced through plural input ports and with programmable visual characteristics, such as varying brightness, color and contrast. A joystick input device controls the display functions by navigating through a menu to a function and selecting a setting for the function. For instance, a static dynamic menu includes scrollable dynamic menu icons that each navigate to a function for selection. One root menu function is to select one-action joystick input device function selections for each of five joystick inputs: up, down, left, right and press down. When the one-action menu is activated, an input detected at the joystick is associated with a single function input and the input is performed in response to the detected joystick input direction. For example, the one-action menu associates a picture in picture presentation of an HDMI source with a left joystick input so that when a left joystick input is detected the picture in picture presentation is made with the HDMI port content. When an end user needs a function other than the defined one-action functions, a press down input opens the root menu and assigns joystick inputs to navigate the menu without the one-action functions activated. The end user therefore has the most commonly used settings available for input with a single action and the remaining functions available with a menu navigation.

The present invention provides a number of important technical advantages. One example of an important technical advantage is that an end user can rapidly select commonly used functions with a single joystick input that avoids menu navigation. When less common functions are desired that are not programmed as shortcuts to the joystick inputs, the end user changes from the one-action menu to the root menu to select the desired function. The root menu includes a function that allows the end user to define for each joystick input direction a function that is performed. For instance, the configuration menu defines a macro function that is performed for each single joystick input when in the one-action menu mode of operation, thus allowing the end user to specify precise settings that are performed in response to a joystick input, such as a brightness level or a toggle between different function values.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A one-action mode at an information handling system display commands display functions based upon an end user preference and exits to an on screen display menu to accept all display function commands through multiple end user inputs. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
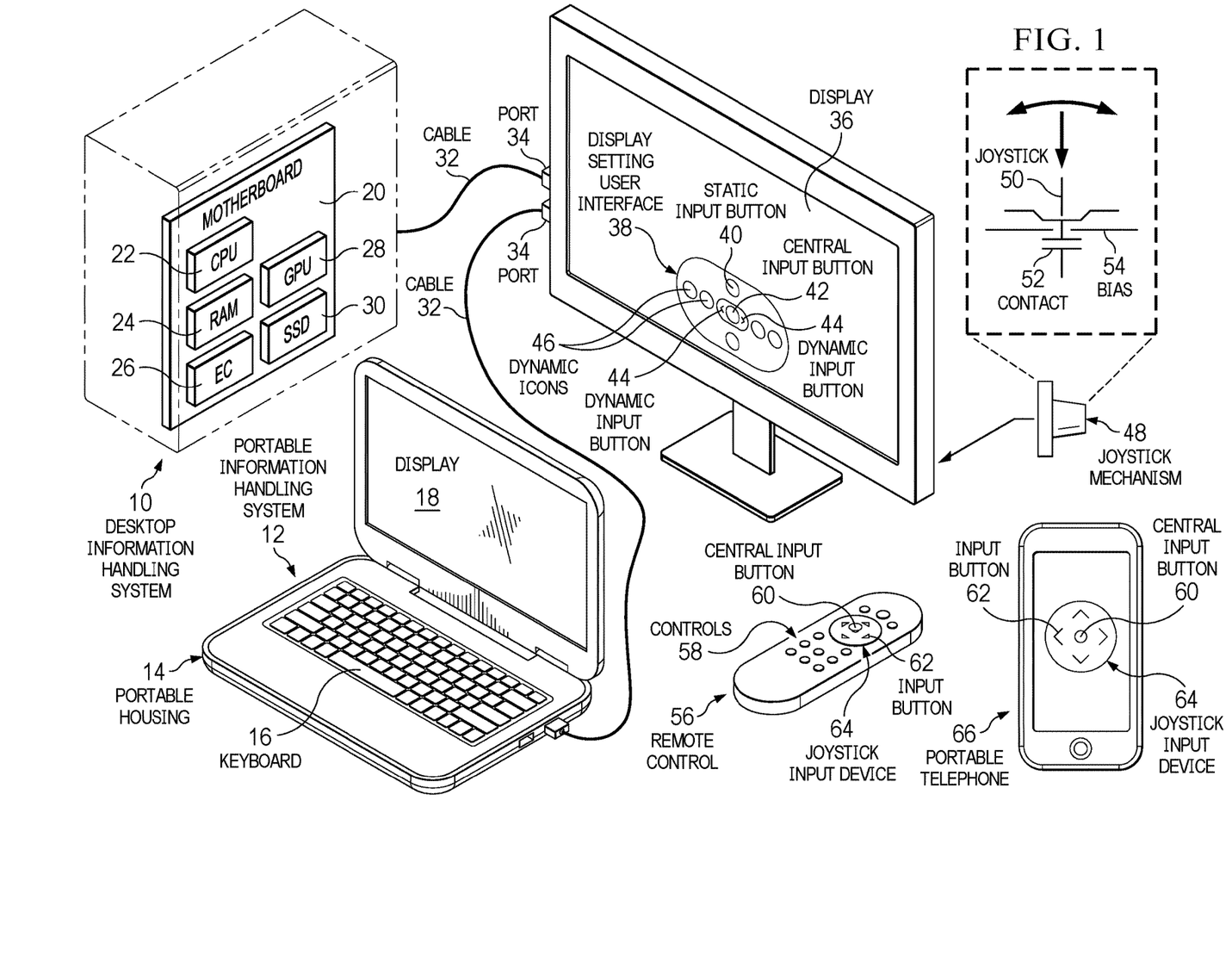
FIG. 1 depicts information handling systems interfaced with a display having a static dynamic on screen menu.

Referring now to FIG. 1, information handling systems interface with a display having a static dynamic on screen menu. In the example embodiment, a desktop information handling system 10 and a portable information handling system 12 interface with a peripheral display 36 through a cable 32 and ports 34, such as USB, DisplayPort, HDMI or other types of display cables and ports. As is described in greater depth below, the user interface also supports a one-action control of display functions. Portable information handling system 10 is built in a portable housing 14 having an integrated keyboard 16 and integrated display 18. Although the static dynamic on screen menu is described with an implementation in peripheral display 36, in an alternative embodiment it may be implemented in the display 18 of portable information handling system 14. In the example embodiment, a motherboard 20 is depicted that may be integrated in either desktop information handling system 10 or portable information handling system 12 to process information. Motherboard 20 supports communication between processing components that cooperate to process information. For example, a central processing unit (CPU) 22 executes instructions to process information with the instructions and information stored in a random access memory (RAM) 24. An embedded controller 26 executes firmware instructions to manage operating conditions of the information handling system, such as application of power and interactions with input/output devices like keyboard 16. A graphics processor unit (GPU) 28 interfaces with CPU 22 to accept information for further processing, such as to generate pixel values that define visual images at pixels of a display. A solid state drive (SSD) 30 or other non-transitory memory devices provides storage of information and instructions during power down states. For example, at application of power, embedded controller 26 executes boot instructions to retrieve an operating system and applications from SSD 30 to RAM 24 for execution by CPU 22. Generally, information is presented at peripheral display 36 based upon pixel values generated by a graphics processor and communicated through a cabled or wireless interface.

Display 36 presents a display setting user interface 38 that accepts display settings from a joystick input device. For example, an internal processing component, such as a timing controller or scalar, includes firmware instructions stored on a non-transient memory, such as a flash memory, that locally generates pixel values for presentation of display setting user interface 38. In one embodiment, display 36 includes a touchscreen that detects touches at display settings user interface 38 to accept inputs. Alternatively, various interfaces may be used to perform display setting inputs as described below. Display setting user interface 38 of the example embodiment includes upper and lower static input buttons 40, a central input button 42, first and second dynamic inputs buttons 44 and plural dynamic icons 46. In the example embodiment, the upper static input button 40 responds to a press by an end user by commanding a static function, such as presentation of a menu that the end user can navigate to reach all available display settings. The lower static input button 40 responds to a press by an end user by commanding an exit from the display setting user interface 38. In various alternative embodiments, other static functions may be assigned to static input buttons 40. Dynamic input buttons 44 are disposed on both sides of a central input button 42 to control scrolling of dynamic icons 46 over central input button 42. Each dynamic icon 46 commands an associated function so that end user selection of the dynamic function is performed by moving the desired dynamic icon 46 over central input button 42 and pressing on central input button 42. In the example embodiment, five dynamic functions may be selected in association with each of five dynamic icons 46. In alternative embodiments, different numbers may be used in a configurable manner by the end user that provides shortcuts for the end user to achieve selections otherwise made with inputs to the static input button 40 for selection of the menu and manual interactions with the menu to select the desired function.

In addition to inputs made through a touchscreen of display 36, a variety of other joystick input devices may be used to interact with display setting user interface 38. In one example embodiment, a mechanical joystick mechanism 48 integrates in display 36 to accept end user selections at a joystick 50 having a contact 52 to detect presses and movements with joystick 50 biased to a neutral position by a biasing mechanism 54, such as an arrangement of springs. For example, a press down on joystick 50 in the neutral position commands an input of the dynamic function associated with the dynamic icon 46 presented at central input button 42. An upward press on joystick 50 commands the static function of the upper static input button 40, such as presentation of the menu. A downward press on joystick 50 commands the static function of the lower static input button 40, such as exit from display setting user interface 38. A right press on joystick 50 scrolls dynamic icons 46 to the right to change the dynamic icon displayed over central input button 42 and a left press on joystick 50 scrolls dynamic icons 46 to the left to change the displayed dynamic icon in the opposite direction. Once an end user has the dynamic icon 46 with a desired associated function presented over central input button 42, a press on central input button 42 commands that dynamic function.

A similar interaction with display setting user interface 38 may be performed with external controllers having a wireless communication, such as an infrared or Bluetooth interface with display 36. For example, a television remote controller 56 includes television controls 58, such as volume and channel selection controls, and a joystick input device 64 having a central input button 60 surrounded by four input buttons 62. Joystick input device 64 provides similar functionality to joystick mechanism 48 with a push of the central input button 60 commanding the function associated with the dynamic icon 46 presented on the central input button 42 of display setting user interface 38 and presses at input buttons 62 corresponding to the positions of joystick 50 for up, down, right and left inputs. A portable telephone information handling system 66 presents a joystick input device 64 at an integrated touchscreen display and provides inputs to display 36 with touches at the touchscreen interpreted similarly to touches at the joystick input buttons of television remote control 56. In one alternative embodiment, portable telephone information handling system 66 may present dynamic icons 46 in a synchronized manner with display 36. The presentation of dynamic icons 46 may be based upon communication of the dynamic icons from display 36 or may be generated at portable telephone information handling system 66 for communication to display 36 so that portable telephone information handling system 66 controls which dynamic icons are presented at display 36. In another alternative embodiment, portable information handling system 12 may present a joystick input device to control both display 18 and/or display 36, such as with an application managed by the operating system or firmware executing on GPU 28 or embedded controller 26. Desktop information handling system 10 may support direct interactions on display 36, such as through a mouse that communicates through cable 32. In one example embodiment, desktop information handling system 10 may be a set top box that communicates with television remote controller 56 to manage interactions with display setting user interface 38.

Although the static dynamic user interface provides an intuitive and quick interface to adjust display configuration settings, in normal use conditions end users tend to have a few defined functions that are used. To address this interaction in an efficient manner, an end user navigates from a root menu of the static dynamic user interface to a one-action menu at which the end user sets defined one-action function commands for the up, down, left and right joystick inputs. When the one-action user interface is activated, each of the up, down, left and right joystick inputs results in a one-action function command to the display. A press down joystick input releases the one-action user interface so that control reverts back to the root menu user interface. As an example, a one action function command performs a predefined configuration, such as setting a defined brightness or contrast, or selecting a predefined source input port for display, such as an HDMI or USB port. As another example, the defined input can be to toggle between two settings, such as turning a picture-in-picture on and off for a source port, or setting a high or low brightness. In an example embodiment with the static dynamic user interface having five presented icons, the one-action configuration assigns a function to each icon and performs the function when the icon is touched at a touch detection surface. Alternatively, the icons slide so that one action function is performed when a joystick press down is input with the one action function in the central location.

Figure 2:
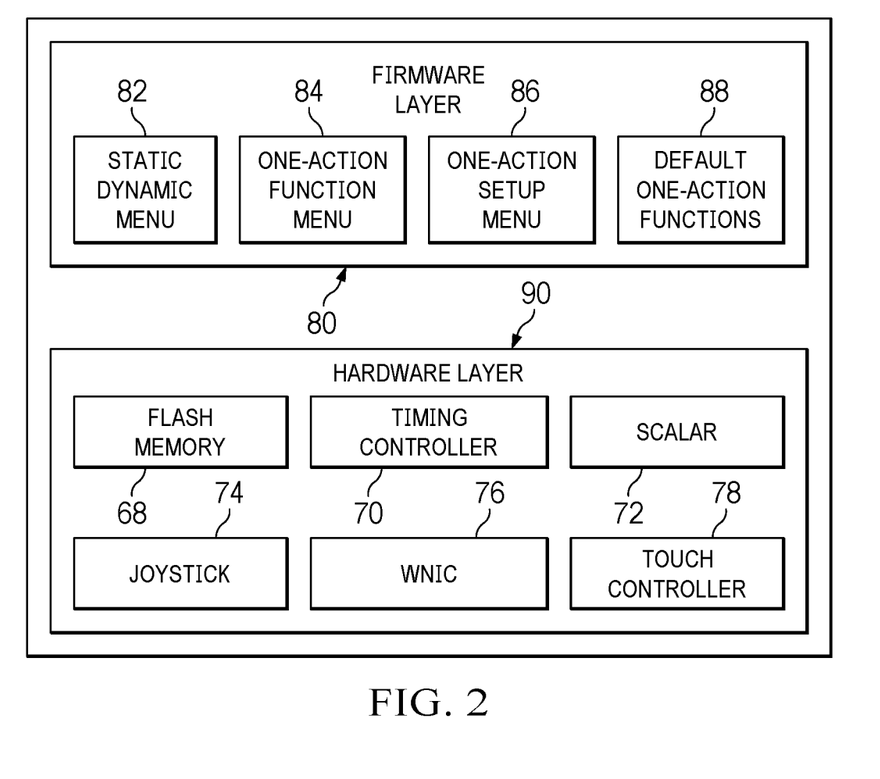
FIG. 2 depicts a block diagram of a display hardware layer and firmware layer to manage interactions between the display setting user interface and an end user.

Referring now to FIG. 2, a block diagram depicts a display hardware layer 90 and firmware layer 80 to manage interactions between the display setting user interface and an end user. Hardware layer 90 includes a flash memory 68 to provide non-transient memory that stores instructions for execution by a timing controller 70 and/or a scalar 72. Timing controller 70 receives pixel values from an information handling system and scans the pixel values to pixels of the display to generate a visual image. Scalar 72 provides processing to scale visual images to a resolution supported by the display, such as high definition or ultrahigh definition. A mechanical joystick 74 integrates in the display to accept end user inputs. In various embodiments, other types of input devices may be included to provide physical inputs to the display. A touch controller 78 interfaces with a touch detection sensor of the display, such as a capacitive touch sensor, to detect and resolve touch inputs. A wireless network interface card (WNIC) 76 provides communication with external devices, such as through infrared or Bluetooth wireless signals. In addition, WNIC 76 may include wired interfaces for communicating through wired interfaces, such as DisplayPort or USB.

Firmware layer 80 includes firmware modules that execute on a processor, such as timing controller 70 or scalar 72, and are stored in non-transitory memory, such as flash memory 68. A static dynamic menu module 82 includes a menu of functions that are performed by the processor, such as through a logical surfing by mechanical joystick 74 or an external controller communicating through WNIC 76, such as described above with respect to the static dynamic user interface. A one-action function menu module 84 stores a dynamic function user interface that accepts end user configurations of one-action functions and, when one-action functionality is selected, performs a configured one action function when a joystick input is detected. A one-action setup menu 86 accepts end user configurations of one-action functions for each joystick input and stores the one-action configurations to apply when the one-action menu is activated. In one embodiment, one-action setup menu 86 holds preconfigured one-action function setups that an end user can select rather than associating a function with each joystick input separately. For instance, a set of preconfigured one action functions might include a USB source selection, an HDMI source selection, a brightness menu presentation and a picture-in-picture activation toggle. A set of selectable one-action functions are available as default one-action functions 88 stored in flash memory 68 for selection by an end user. At initial power up, the default one-action functions are applied to accept end user inputs if the one-action function menu is activated. The default one-action functions can vary based upon the display capabilities to include the most likely end user functions.

Figure 3:
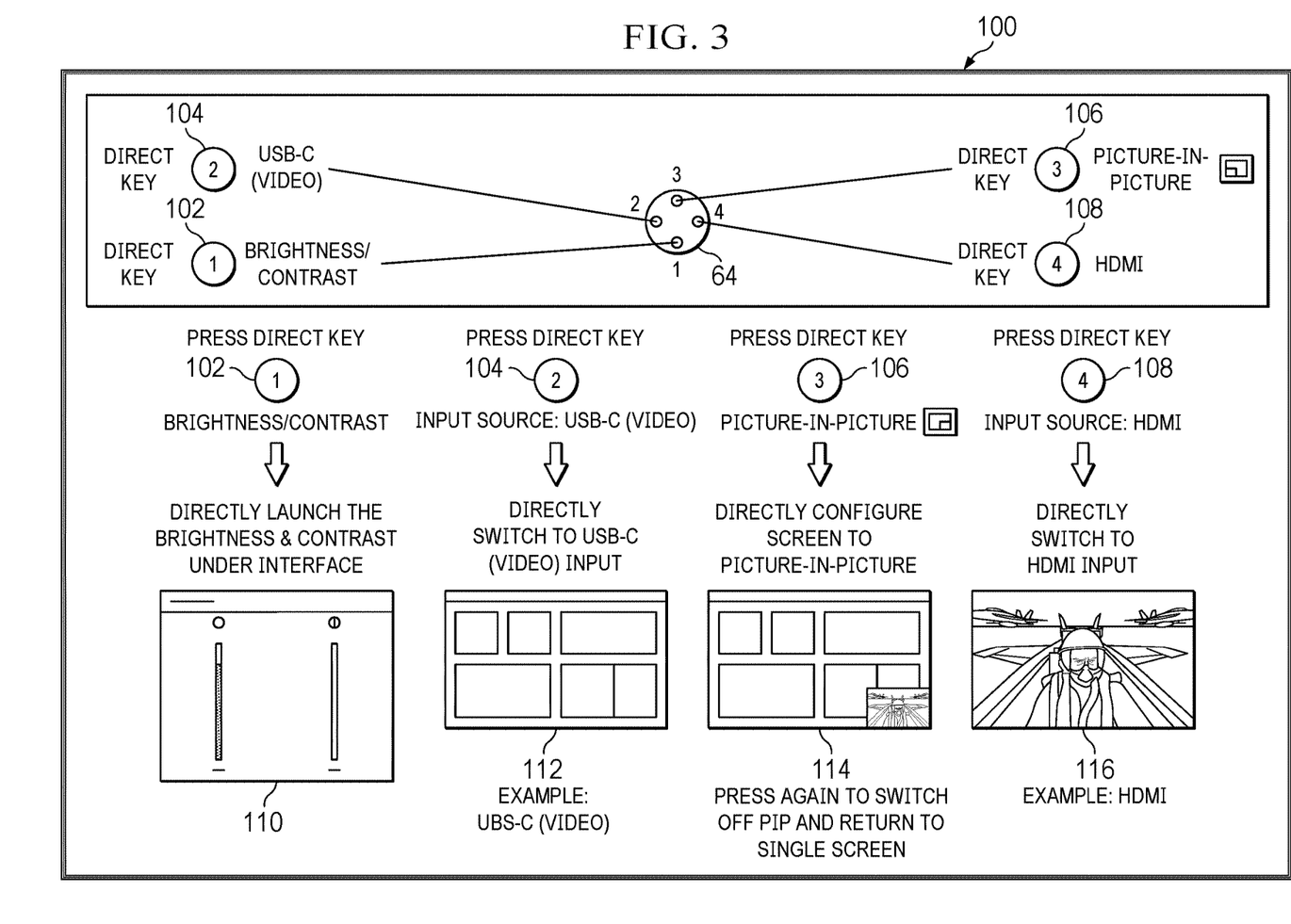
FIG. 3 depicts an example of associations between one-action joystick inputs and functions for a display.

Referring now to FIG. 3, an example of associations between one-action joystick inputs and functions for a display are depicted. In the example embodiment, a joystick input device 64 accepts up, down, left, right, and press down inputs. When the one-action menu 100 is activated, each joystick input device input activates a display function with a single input. The example embodiment shows four one-action joystick inputs with each of the up, down, left and right inputs associated with one function. A one action down joystick input 102 commands a brightness/contrast user interface 110 presentation to directly launch at which the end user can then select a brightness and or a contrast setting. In the example embodiment, after activation of the brightness and contrast menus, the joystick converts to accept inputs to the menu with up and down inputs selecting brightness and contrast levels, and left and right inputs selecting whether the up and down inputs are for brightness and contrast. Once the brightness and contrast adjustments are complete, a press down input at the joystick returns the system to the one-action menu. In alternative embodiments, the down input might command a specific brightness setting or a toggle between two specific brightness settings, such as for day and night display viewing. The left input 104 commands a one-action change to the USB-C input source for presentation of video at the display. In the example embodiment, display presentation 112 with video from the USB source is activated in response to the left joystick input 104. Similarly, an up input 106 commands a picture-in-picture function as shown by display presentation 114. In one alternative embodiment, a single input might command a toggle action to change between the USB and HDM input sources to the picture in picture window. The picture in picture presentation command may always respond by turning on the picture in picture or, alternatively, toggle between turning the picture in picture on and off. A right input 108 commands selection of the HDMI port as the source for presentation at the display, such as to present an audiovisual movie 116 at the display. In another example embodiment, the right input might toggle between different input sources for the picture in picture, such as the USB and HDMI input sources. As an alternative, the four direct keys default to a menu launcher so that an end user who in advertently initiates one-action inputs will default to the menu for clarity. In another embodiment, the menu launcher may start at a location to configure the one-action input values so that configuration is automatically started when one-action inputs are selected without one-action inputs associated with an input direction selected by an end user.

The direct keys, such as are shown in FIG. 3, are personalizable so that an end user can configure each joystick direction as a desired one-action command. The examples in FIG. 3 depict one possible configuration that provides one-action inputs for HDMI, Brightness/Contrast, PIP/PBP, present modes and a video source swap. In various configurations, virtually any selection available through a full menu interaction may be assigned as a one-action inputs, such as by initiating a macro of commands defined by an end user. The one action input can include values for selected fields, such as brightness, contrast and color so that the end user can rapidly adjust to different viewing conditions, such as with a room shade open or closed. The defined inputs for the one-action input can include toggling through a list of inputs, such as each video source in turn, so that the end user has flexibility in how to perform interactions with the display through the joystick. In one example embodiment, the direct shortcuts shown in FIG. 3 are preconfigured as default shortcuts that take effect on initial power up of the display.

Figure 4:
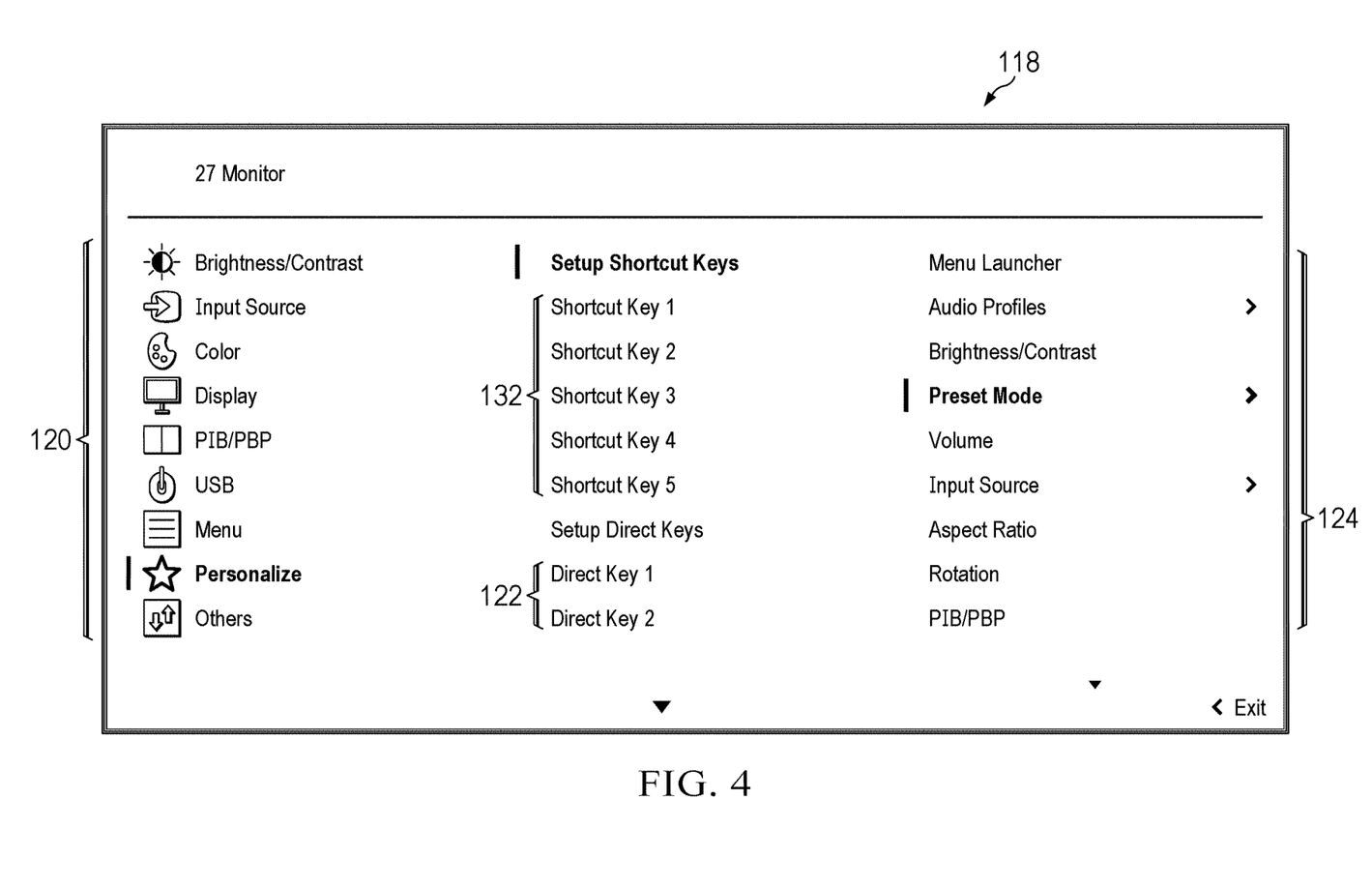
FIG. 4 depicts an example graphical user interface that supports configuration of a one-action function assigned to each joystick input device input direction.

Referring now to FIG. 4, an example graphical user interface is depicted that supports configuration of a one-action function assigned to each joystick input device input direction. A root menu 120 has functions that an end user can select to control display operations, such as by entering brightness to select a display brightness or input source to select a port that provides video for presentation at the display. In the example, the end user has selected a personalize function that allows the end user to configure one action inputs performed in response to a joystick input device input. Four direct shortcuts 122 are each programmed to associate one each with the up, down, left and right joystick inputs. Direct input programmable options 124 are selectable for each direct shortcut 122. In the example embodiment, the user has selected a preset mode that includes a variety of commonly used inputs, such as those shown in FIG. 5 discussed below. As an alternative, the end user may follow any other programmable option to define a macro that is performed when the direct shortcut is selected. The first option, a menu launcher, is a default for a press down input at the joystick, however, can instead be associated with other joystick inputs while the press down joystick input is assigned a different value. As an example, the direct shortcut can be programmed to select brightness followed by a specific brightness setting. As another example, a picture in picture direct shortcut and include a selection of a specific video source.

Figure 5:
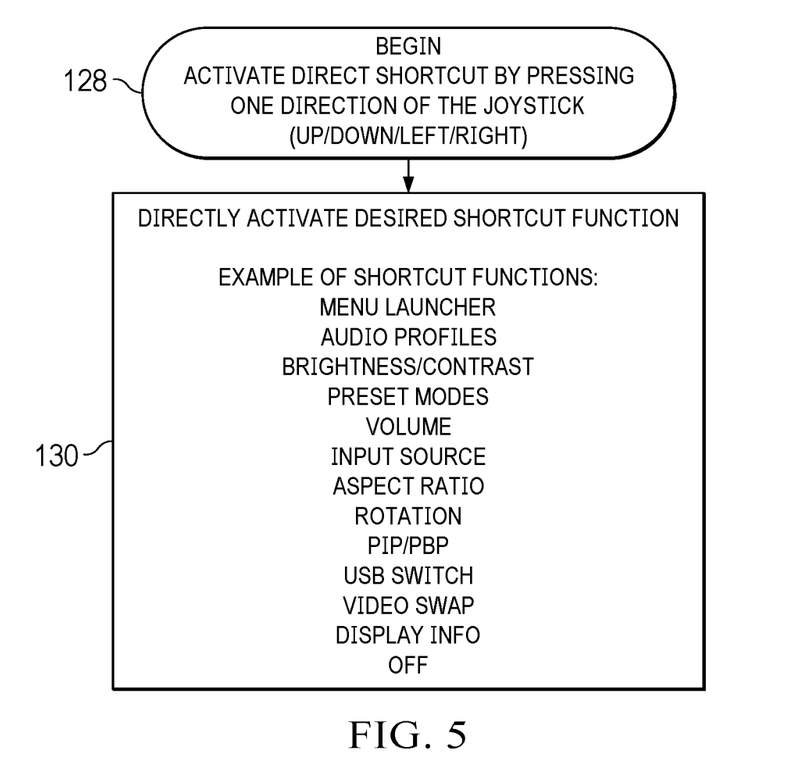
FIG. 5 depicts a flow diagram of a process for performing a one-action function selection though a joystick input device input.

Referring now to FIG. 5, a flow diagram depicts a process for performing a one-action function selection though a joystick input device input. The process starts at step 128 with activation of the direct shortcut or one-action menu at the display. One-action selections may be activated by an end user through a root menu or as a default after the display is initially configured. When the one-action menu is activated, an input at the joystick commands a function associated with the input by a single input. At step 130 a list of one-action functions available through the preset mode is shown that can each be commanded when an associated joystick input is detected. For example, the menu launcher commands entry to the root menu level in response to a joystick press down input. The other commands may be associated with the up, down, left and right joystick inputs so that four direct shortcuts are available. If an end user needs to perform a display control function beyond the four available direct shortcuts, the end user performs a press down input at the joystick to activate the root menu.

Figure 6:
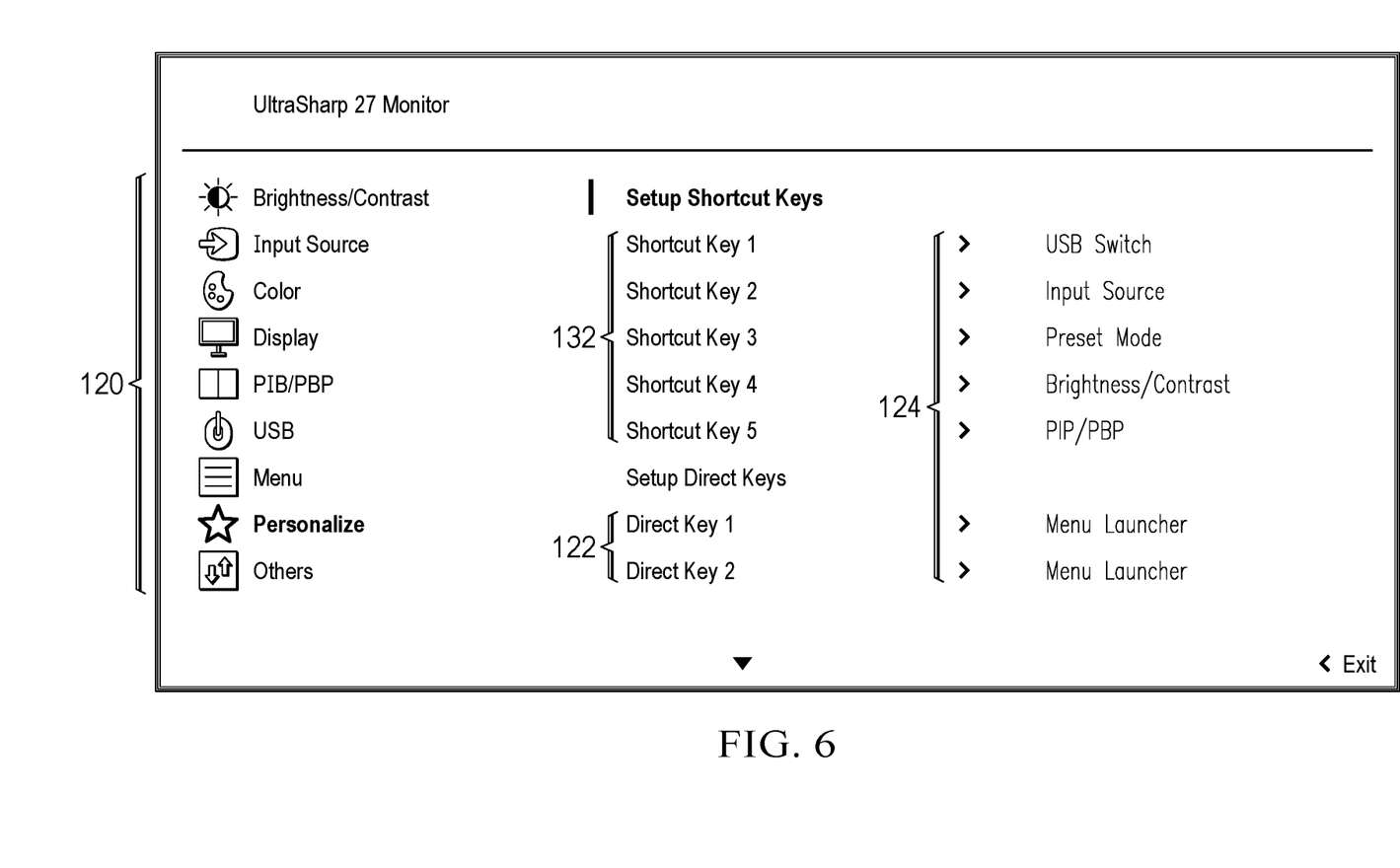
FIG. 6 depicts a graphical user interface example of an alternative embodiment that selectively assigns direct shortcut functions to the static dynamic user interface.

Referring now to FIG. 6, a graphical user interface depicts an example of an alternative embodiment that selectively assigns direct shortcut functions to the static dynamic user interface. For instance, the five presented dynamic icons are each assigned a one-action function so that an end user selection of an icon commands the function. The direct shortcut functions for the dynamic icons may be separate from or an addition to the direct functions available with joystick inputs. When a touch display is available, a touch on the dynamic icon can initiate the function. When the dynamic icon direct shortcut is activated without the joystick direct shortcut, the end user can scroll left or right to select a function and press down at the joystick to command the function. The root menu 120 or the programmable options 124 are available in the graphical user interface to define the direct shortcuts 122 or five available shortcut keys 132 each associated with one of the five dynamic icons of the static dynamic menu.

Figure 7:
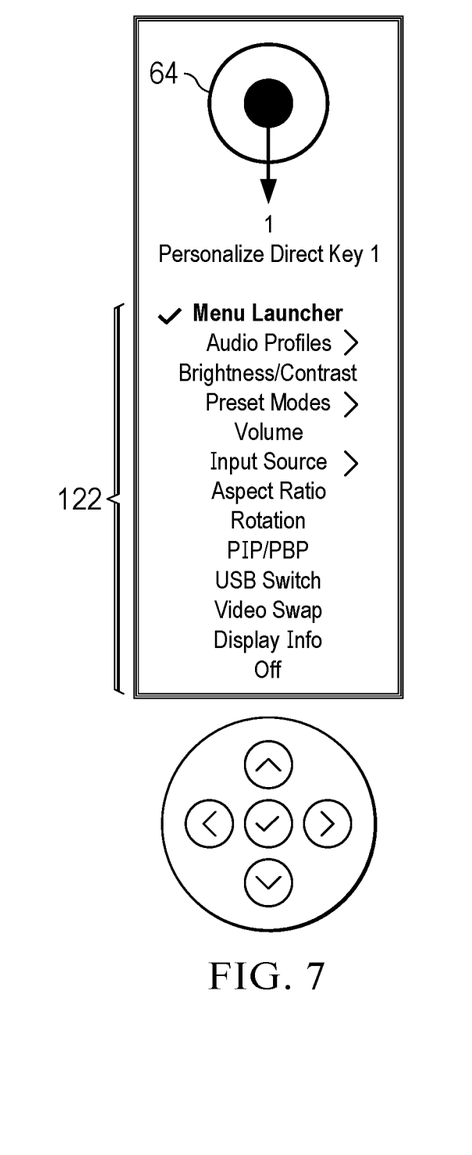
FIG. 7 depicts an example of a logical flow associated with a direct input.

Referring now to FIG. 7, an example of a logical flow associated with a direct input is depicted. In the example, direct shortcuts 122 are accessed when joystick 64 is in a one-action menu mode. Display menu function logic detects the down input indicated by 1 and looks up the function associated with the input. The function is then initiated in response to the single input. In the example, the function is a menu launcher that launches the menu to a root menu from which the end user can navigate to other functions.

Figure 8:
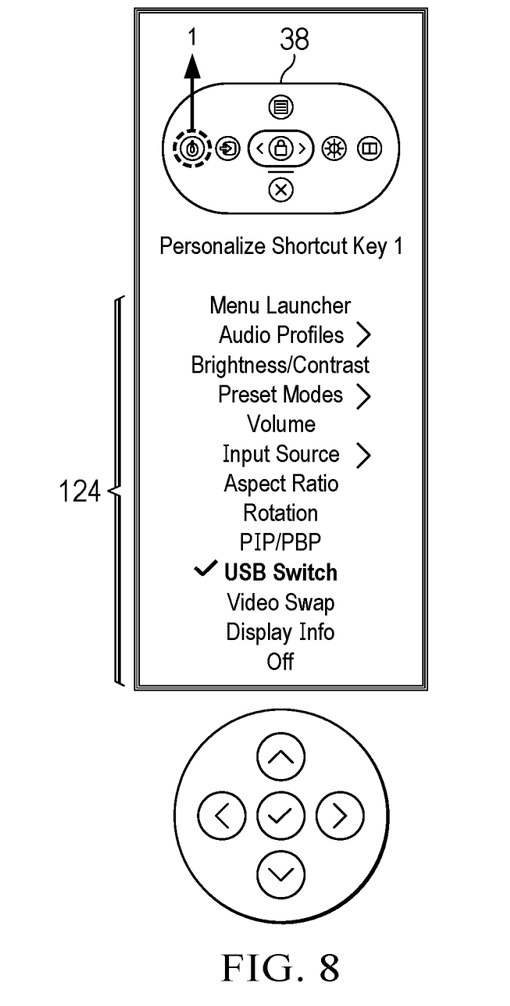
FIG. 8 depicts an example of a logical flow associated with a direct input through a dynamic icon.

Referring now to FIG. 8, an example of a logical flow associated with a direct input through a dynamic icon is depicted. When the static dynamic user interface 38 is active and in the one-action menu mode, programmable options 124 are referenced for each icon input and performed when an input is detected. The five dynamic icons are programmable for any of the defined functions and the function is performed when an input is commanded at the dynamic icon.

Although the present invention has been described in detail, it should be understood that various changes, substitutions and alterations can be made hereto without departing from the spirit and scope of the invention as defined by the appended claims.

What is claimed is:

1. An information handling system display comprising:
a processing resource;
a non-transitory memory interfaced with processing resource;
a display panel interfaced with the processing resource and operable to present information as visual images;
a joystick input device having up, down, left, right and press down input actions; and
instructions stored in the non-transitory memory that when executed on the processing resource cause:
presentation of an on screen display menu having plural function menus, each function menu selectable from a root menu by plural menu-select joystick input device actions, each of the plural function menus supporting selection of a function with plural input actions; and
a one-action function menu configuration selectable for the on screen display menu that assigns one of the plural function menus to each one of the up, down, left and right input actions to provide one direct shortcut for each one of the up, down, left and right inputs.

2. The information handling system of claim 1 wherein the instructions further:
associate a press down input action with a command to exit the one-action function menu.

3. The information handling system of claim 2 wherein the joystick input device comprises a joystick integrated on a back side of the display.

4. The information handling system of claim 2 further comprises a remote control wirelessly interfaced with the display and integrating the joystick input device.

5. The information handling system of claim 2 wherein the one-action function menu plural function menus comprise selection of an input source from plural available input sources.

6. The information handling system of claim 2 wherein the one-action function menu plural function menus comprise selection of a predetermined display brightness from plural available display brightness.

7. The information handling system of claim 1 wherein the plural function menus include a menu that selects the plural function menus to assign to the up, down, left and right input actions.

8. The information handling system of claim 7 further comprising:
a default one-action function menu assigned to each of the up, down, left and right input actions; and
plural preprogrammed one-action function menus selectable from a list to replace the default one-action function menus.

9. The information handling system of claim 8 wherein the plural preprogrammed one-action function menus in the list include a picture-in-picture toggle for each of plural display input sources.

10. A method for accepting inputs through a joystick to a display, the method comprising:

presenting an on screen menu at the display, the on screen menu having plural function menus selectable from a root menu by plural menu-select joystick input device actions, each of the plural function menus supporting selection of a function with plural input actions;

commanding through the on screen menu a one-action function menu for inputs accepted at the joystick input device; and performing one of the functions in response to a single input action, each of the joystick input device actions having a different one of the functions to provide one direct shortcut for each one of the joystick single input actions.

11. The method of claim 10 further comprising:
accepting joystick input actions in the one-action function menu as up, down, left and right to perform a different of the one of the functions for each of the up, down, left and right joystick input actions; and accepting a joystick input action of press down in the one-action menu to command a return to the on screen menu joystick inputs.

12. The method of claim 10 wherein the one-action function comprises a toggle on and off of a picture in picture content of a predetermined input source.

13. The method of claim 10 wherein the one-action function comprises a brightness of a predetermined setting.

14. The method of claim 10 wherein the one-action function comprises a selection of a predetermined input source to present at the display.

15. The method of claim 10 further comprising:
from the on screen menu at the display selecting from the root menu a one-action configuration menu; and
assigning a one-action function through the one-action configuration menu to each of an up, down, left and right joystick input.

16. The method of claim 15 further comprising:
presenting a static dynamic menu at the display having five input icons; and
configurating each of the five input icons as a one-action function.

17. A system for accepting function inputs to a display through a joystick input device having up, down, left, right and press down inputs, the system comprising:
a processing resource interfaced with the joystick input device; and
a non-transitory memory interfaced with the processing resource and storing instructions that when executed on the processing resource cause:
presentation of an on screen display menu having plural function menus, each function menu selectable from a root menu by plural menu-select joystick input device actions, each of the plural function menus supporting selection of a function with plural input actions; and
a one-action function menu configuration selectable for the on screen display menu that assigns one of the plural function menus to each one of the up, down, left and right input actions to provide one direct shortcut for each one of the up, down, left and right inputs.

18. The system of claim 17 wherein:
the instructions further associate a press down input action with a command to exit the one-action function menu; and
the joystick input device comprises a joystick integrated on a back side of the display.

19. The system of claim 17 wherein the instructions further:
present a static dynamic menu at the display having five input icons; and
configurating each of the five input icons as a one-action function.

20. The system of claim 17 wherein the instructions further:
from the on screen menu at the display, select present at the root menu a one-action configuration menu; and
assign a one-action function through the one-action configuration menu to each of an up, down, left and right joystick input.

* * * * *